United States Patent
Eberlein et al.

(10) Patent No.: US 6,847,440 B2
(45) Date of Patent: Jan. 25, 2005

(54) METHOD FOR MEASURING THE OPTICAL SIGNAL-TO-NOISE RATIOS OSNR IN A WAVELENGTH DIVISION MULTIPLEX (WDM) TRANSMISSION SYSTEM

(75) Inventors: Joerg Eberlein, Wolfratshausen (DE); Juergen Martin, Aying (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/607,350

(22) Filed: Jun. 26, 2003

(65) Prior Publication Data

US 2004/0135993 A1 Jul. 15, 2004

(30) Foreign Application Priority Data

Jun. 27, 2002 (DE) .......................................... 102 28 750

(51) Int. Cl.[7] .............................................. G01N 21/00
(52) U.S. Cl. .................................................... 356/73.1
(58) Field of Search ...................... 356/73.1, 320–328; 398/9, 26, 34, 95, 81, 5, 175; 359/337, 337.4, 341.1, 341.4; 250/214 R, 214 C, 227.12, 227.24

(56) References Cited

U.S. PATENT DOCUMENTS 6,433,864 B1 * 8/2002 Chung et al. ............... 356/73.1
6,549,572 B1 * 4/2003 Anderson et al. ........... 375/225
6,660,990 B2 * 12/2003 Boertjes et al. ......... 250/214 A

FOREIGN PATENT DOCUMENTS

WO    WO 02/09299    1/2002

* cited by examiner

Primary Examiner—Tu T. Nguyen
(74) Attorney, Agent, or Firm—Bell Boyd & Lloyd LLC

(57) ABSTRACT

A method for measuring the optical signal-to-noise ratio in a Wavelength Division Multiplex (DWDM/WDM) transmission system is described in which the effect of the amplified spontaneous emission ASE differs through different components located in the transmission system such as various filters, for example. The measuring points of the signal and noise powers to measure the optical signal-to-noise ratio are selected in accordance with the spectral characteristics of these components by a network management system.

7 Claims, 4 Drawing Sheets

METHOD FOR MEASURING THE OPTICAL SIGNAL-TO-NOISE RATIOS OSNR IN A WAVELENGTH DIVISION MULTIPLEX (WDM) TRANSMISSION SYSTEM

BACKGROUND OF THE INVENTION

A method of regulating the preemphasis of channels from a Wavelength Division Multiplex (WDM) signal is known from WO 0209299 A2, in which a measurement of the optical signal-to-noise ratio OSNR is performed in relation to the amplified spontaneous emission ASE. Two variants for measuring the amplified spontaneous emission ASE between channels after admission by a periodic filter (interleaver filter) are described in which an extrapolation of the measured values of noise power between two channels or at the edge of the overall channel spectrum occurs. The point at which the noise power is measured, where the amplified spontaneous emission ASE occurs in different ways, is, however, system-dependent; i.e., it changes in accordance with the filter used through which the WDM signal passes. There is, therefore, no system-related adaptation for determining the noise power here. The measurement method also requires a great deal of effort since it is based on a measurement in a notch between two channels. As such, measurements must be taken before each interleaver filter and, at the link end, the entire measured values of the amplified spontaneous emission ASE must be added together. In practice, this means that a relatively expensive measurement unit must be connected before each filter.

An object of the present invention is, therefore, to specify a method which, depending on the filters or components used which influence the spectrum of the transmitted signals, allows the optical signal-to-noise ratios to be measured with; little effort.

SUMMARY OF THE INVENTION

Starting from a method of measuring the signal-to-noise ratios of channel signals in a transmission system for Wavelength Division Multiplex signals containing frequency-dependent components, for which the signal power of a containing frequency-dependent components, for which the signal power of a channel signal and the noise power at a noise measurement frequency selected outside the channel signal are measured and the signal-to-noise ratio is determined from the measurement results, in accordance with the present invention a signal measurement frequency and, depending on the measurement location and thereby on the frequency-dependent components, the noise measurement frequency, with a predetermined gap to the mid frequency of the channel signal, are selected by a controller for each channel signal.

A significant advantage of the method in accordance with the present invention can be seen in the fact that a transmission system management controls the selection of the noise measurement frequency of a channel signal. Depending on the measuring location in the transmission system or depending on how the signal is affected by the components, the amplified spontaneous emission as well as further noise or distortion sources affect the signal in different ways. Depending on the measurement location and the components through which it passes, the position of the noise measurement frequency at which optimum determination of the signal-to-noise ratios is possible will be selected accordingly. This allows a system-independent tailored measurement of the optical signal-to-noise ratios at the end and at another desired point in a transmission link.

The main components that that are envisaged to have a spectral effect on the signals are interleavers, add-drop modules, multiplexers or demultiplexers. Each component located in the transmission system that does not have a spectral influence on the signal is regarded as transparent.

The use of the method in accordance with the present invention is especially advantageous for dynamically configurable WDM transmission systems with different spectral filtering and/or separate network paths for different channels. As the number of channels increases (i.e., with smaller channel spacing or with higher modulation frequencies as a result of sideband module expansion), the frequency position for measuring the optical signal-to-noise ratio at amplified spontaneous emission must be re-regulated. Knowledge of the characteristics of the components used in the network is employed to automatically set an optimum measurement of the optical signal-to-noise ratios. If a change in the width of channel signals, such as by self-phase modulation, cross phase modulation or "Enhanced Forward Error Correction" is detected, a new frequency position is accordingly defined to measure the optical signal-to-noise ratios. The automatic method is controlled by the network management software.

A transmission system for WDM or DWDM (Dense Wavelength Division Multiplexing) signals with typical channel spacings of 50 GHz is considered as a network.

Additional features and advantages of the present invention are described in, and will be apparent from, the following Detailed Description of the Invention and the figures.

DETAILED DESCRIPTION OF THE INVENTION

Figure 1:
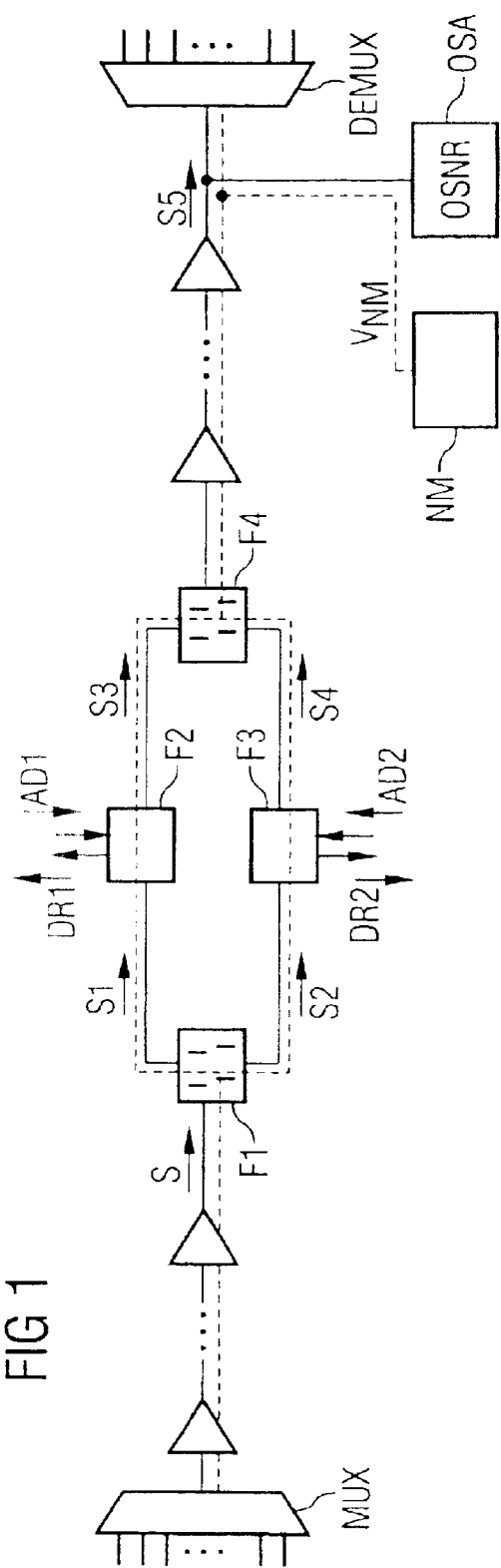
FIG. 1 shows a schematic diagram of measurement of the optical signal-to-noise ratio in a network with interleaver filters and an add-drop module.

FIG. 1 shows a schematic diagram of a measurement of the optical signal-to-noise ratios OSNR at an optical spectrum analyzer OSA in a network controlled by a Network Management System NM. Channel signals are merged into a DWDM signal S with channel spacings of 50 GHz through a multiplexer MUX which is routed after a first transmission link to an interleaver filter F1. At the output of interleaver filter F1, two WDM signals S1, S2 are output from DWDM signal S with now doubled channel spacings of 100 GHz. Furthermore, the two WDM signals S1, S2 each pass through an add-drop module F2, F3, in which one or more channels DR1, DR2 is dropped and one or more channels AD1, AD2 are added. From the add-drop modules F2, F3, two WDM signals S3, S4 are routed to a further downstream interleaver filter F4 for merging all of their channels into a DWDM signal S5 with channel spacings of 50 GHz. At the end of the transmission link is an optical spectrum analyzer OSA (e.g., connected in front of a demultiplexer DEMUX as a measurement unit, in which the optical signal-to-noise ratio OSNR of the DWDM signal S5 is measured. The optical spectrum analyzer also can be located at another measuring position in the transmission system. The optical signal-to-noise ratios OSNR of the DWDM signal S5 are only measured for channels between which there is an unoccupied channel, i.e., here with a spacing of at least 100 GHz.

A network management system NM is connected to all components of the transmission system via a connection VNM.

The interleaver filter F1, F4 and the add-drop modules F2, F3 feature different spectral characteristics that have a characteristic effect on the amplified spontaneous emission ASE in the measurement of the optical signal-to-noise ratios OSNR. In FIG. 1, the interleaver filters F1, F4 primarily operate with narrower spectral passbands of around 25 GHz than the add-drop modules F2, F3 with spectral passbands of approximately 40 GHz. The interleavers are periodic with a frequency spacing of 100 GHz. Therefore, the network management NM will make settings here on the optical spectrum analyzer OSA in accordance with prespecified characteristics in relation to the interleaver filters F1, F4.

Figure 2:
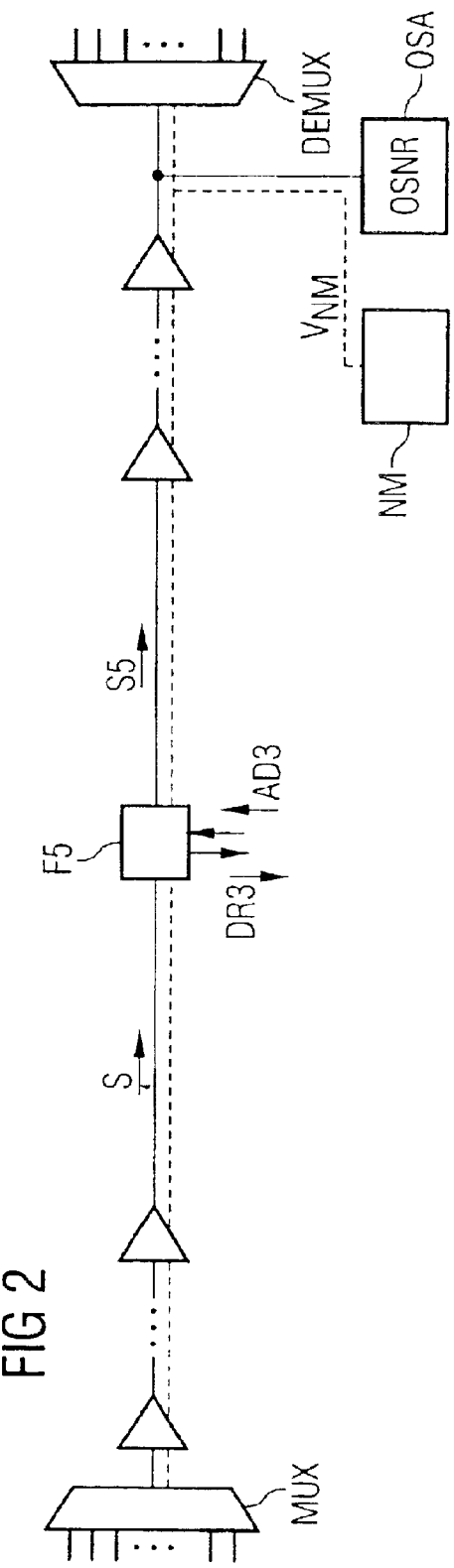
FIG. 2 shows a schematic diagram of measurement of the optical signal-to-noise ratio in a network with an add-drop module.

FIG. 2 shows a schematic diagram of a measurement of the optical signal-to-noise ratio OSNR in a network with just one add-drop module F5 instead of the interleaver filters F1, F4 and the add-drop modules F2, F3 in accordance with FIG. 1. In this case, drop channels DR3 are dropped from the transmission link from the transmitted WDM or DWDM signal S and further add channels AD3 are added to the signal S to create an outgoing WDM or DWDM signal S5 from add-drop module F5. Channels of signal S that pass transparently through add-drop module F5 are called express channels. The form of the amplified spontaneous emission ASE between two channels of signal S5 with a channel spacing of 100 GHz is now dependent on the spectral characteristics of the add-drop module F5. Network management NM will control a setting on the optical spectrum analyzer OSA for measuring the optical signal-to-noise ratios ONSR depending on these characteristics.

Figure 3:
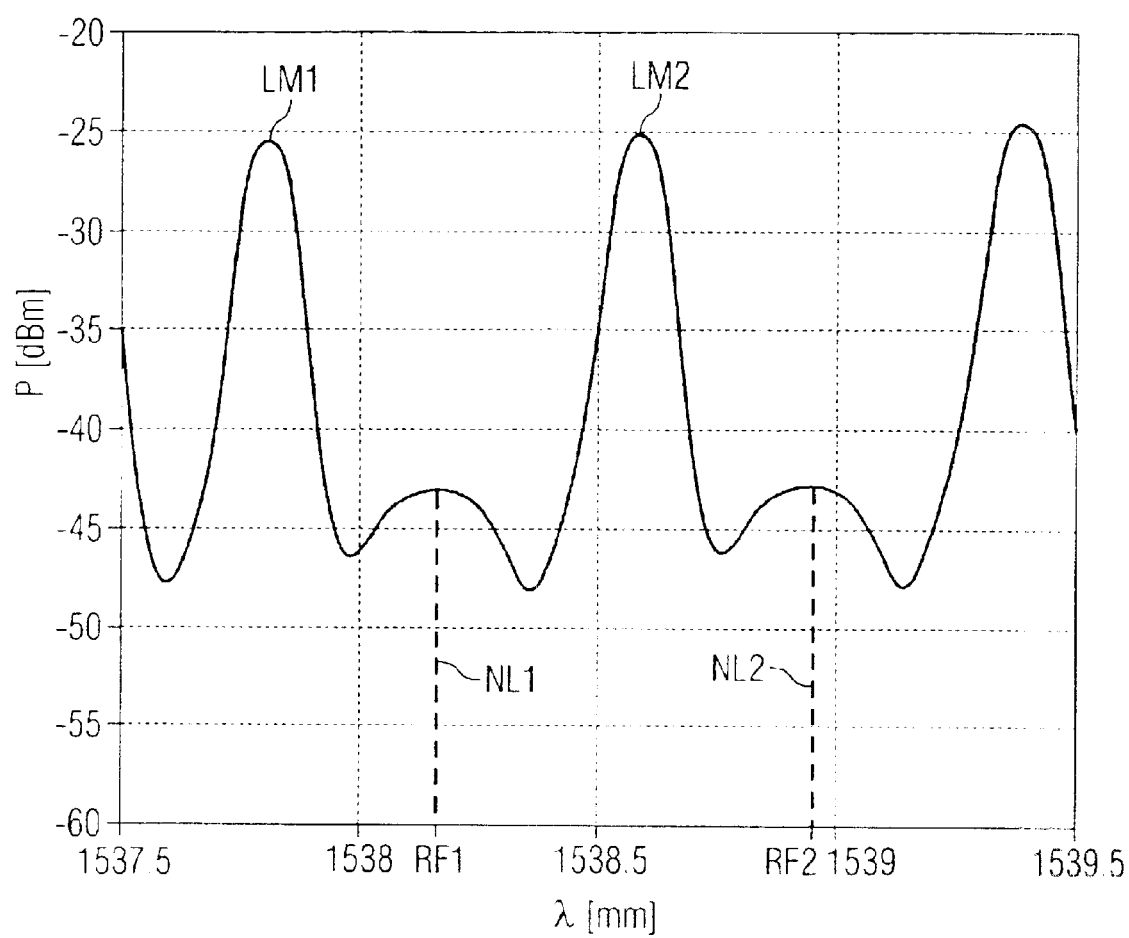
FIG. 3 shows a spectrum of a number of channels at the output of a WDM transmission system in accordance with FIG. 1.

FIG. 3 shows a spectrum P(λ) measured at the optical spectrum analyzer OSA of a number of channels of DWDM signal S5 after it has passed through the interleaver filters F1, F4 and the add-drop modules F2, F3 in accordance with FIG. 1. The resolution at the optical spectrum analyzer OSA is 0.1 nm. The channels have a spacing of 100 GHz. The lower amplitude lines NL1, NL2 in the middle between the amplitude maxima LM1, LM2 of the channels represent the actual foundation of the amplified spontaneous emission ASE which passes through the interleaver filter F1. The intermediate notches are an effect of the interleaver filters F1, F4. For a suitable measurement of the optical signal-to-noise ratios OSNR, noise measurement frequencies RF1, RF2 are set by Network Management NM to determine the noise power in accordance at a spacing of 50 GHz to the corresponding signal measurement frequencies at the amplitude maxima LM1, LM2 and set on the optical spectrum analyzer OSA.

Figure 4:
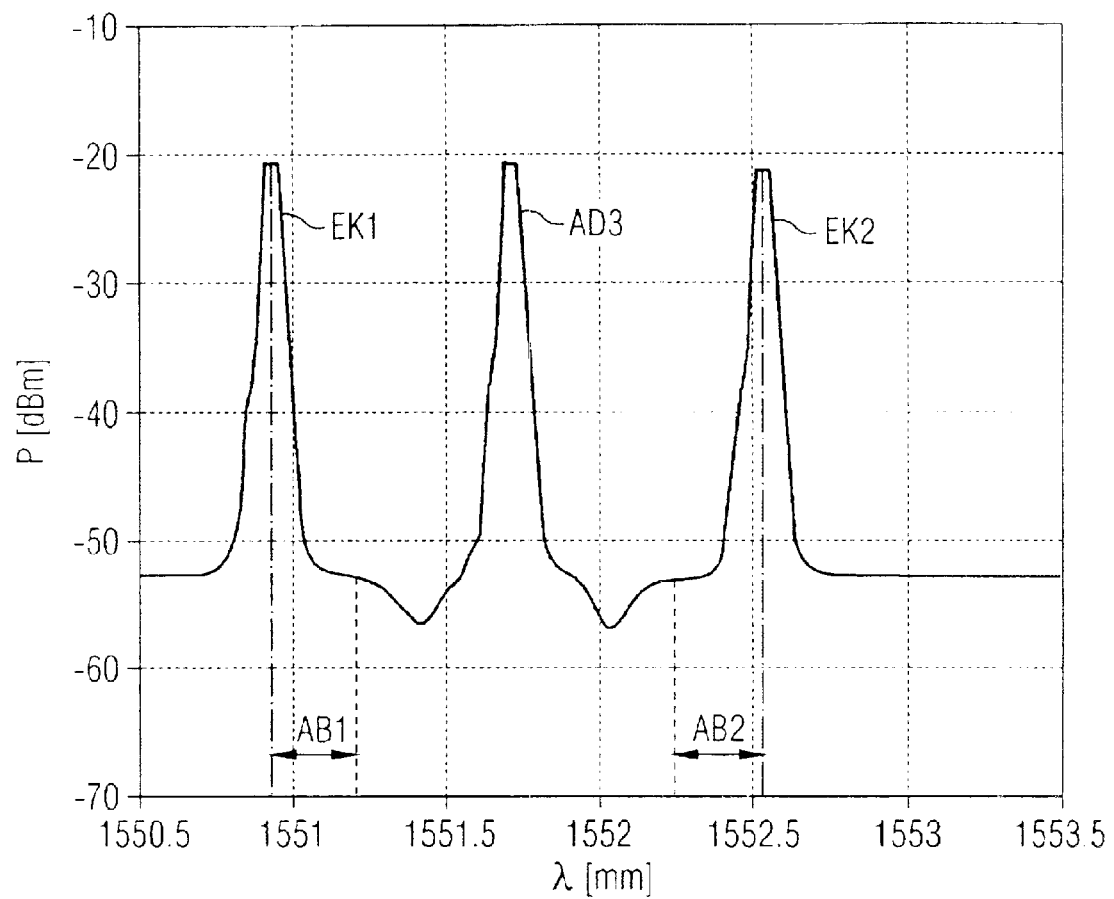
FIG. 4 shows a spectrum of a number of channels at the output of a WDM transmission system in accordance with FIG. 2.

FIG. 4 shows a spectrum P(λ) measured at the optical spectrum analyzer OSA of two through channels EK1, EK2 as express channels with an intermediate add channel AD3 of the WDM signals S after passing through the add-drop module F5 in accordance with FIG. 2. The resolution at the optical spectrum analyzer OSA is 0.06 nm. By contrast to an interleaver filter, an add-drop module excludes the amplified spontaneous emission at a distance of 50 GHz from a line maximum. The noise measurement frequency to measure the optical signal-to-noise ratio OSNR of express channels EK1, EK2 must be selected here to be a suitable frequency spacing AB1, AB2 from the maximum power. In practice, the spacing lies in the range of around 20 through 40 GHz; i.e., in the shoulder of the power peak. To determine the measurement point for the signal and noise power, two methods can be used; either a spacing defined by the Network-Management NM of maximum power (e.g., 28 GHz) is taken or a curve analysis is undertaken. For this exemplary embodiment, a 10 Gbit/s WDM signal with forward error correction is measured. When the width of one channel through to all channels changes, the selected spacing can be reset.

Figure 5:
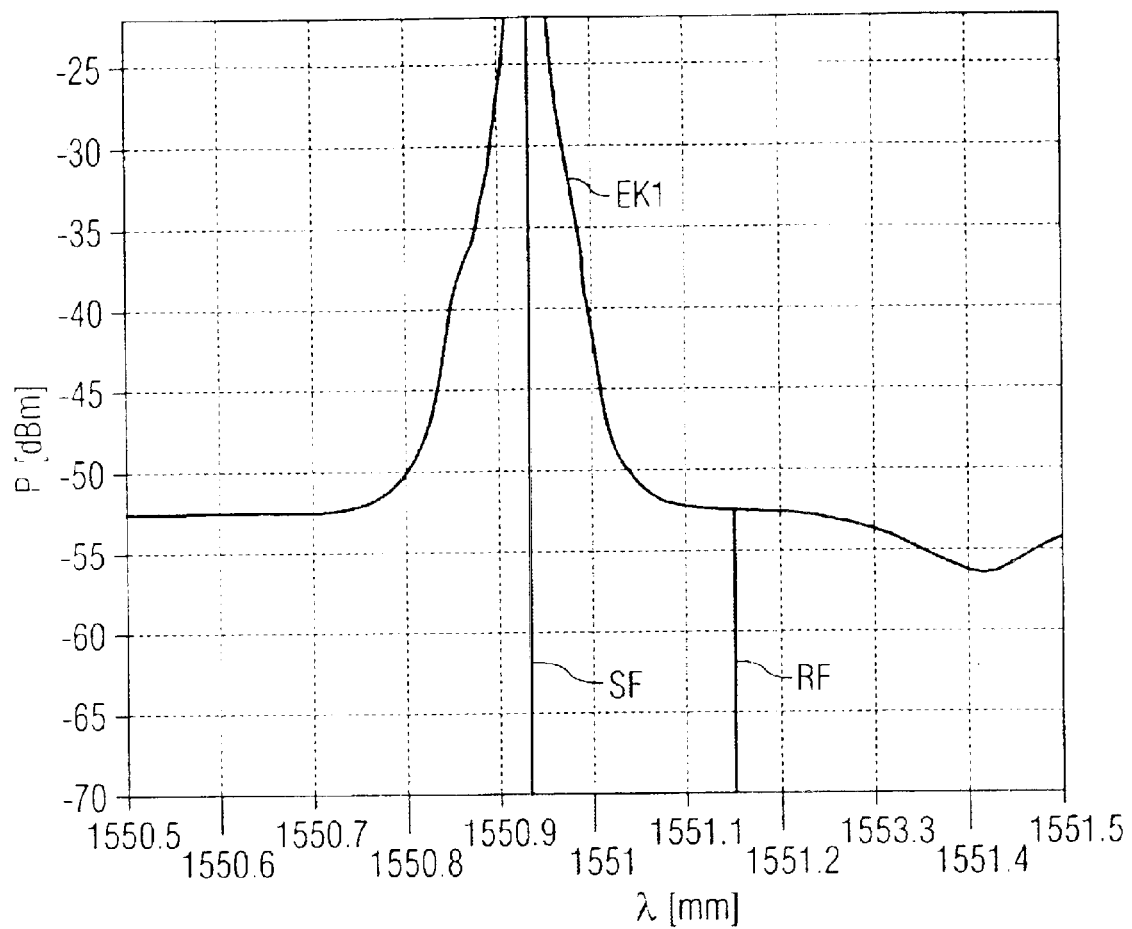
FIG. 5 shows the enlarged cross-section from FIG. 4.

FIG. 5 shows a spectrum P(λ) of express channel EK1 at the output of a DWDM transmission link with one add-drop module in accordance with FIGS. 2 and 4. The two measuring points SF and RF for determining the signal and noise powers are shown by dashed lines at approximately 1550.92 nm and at approximately 1551.16 nm.

The method in accordance with the present invention is, of course, not limited to interleavers, add-drop modules, multiplexers or demultiplexers, but will be easy to expand by network management for other components currently used or to be used in the future which affect the amplified spontaneous emission ASE.

Indeed, although the present invention has been described with reference to specific embodiments, those of skill in the art will recognize that changes may be made thereto without departing from the spirit and scope of the present invention as set forth in the hereafter appended claims.

What is claimed is:

1. A method of measuring an optical signal-to-noise ratio of a channel signal in a transmission system for Wavelength Division Multiplex signals, wherein the transmission system contains frequency-dependent components, the method comprising the steps of:

selecting, via a controller, a signal measurement frequency for the channel signal;

selecting, via the controller, a noise measurement frequency with a pre-specified spacing to a mid-frequency of the channel signal, depending on both a measurement location and the frequency-dependent components;

measuring a signal power of the channel signal and a noise power of the noise measurement frequency selected outside the channel signal; and determining the optical signal-to-noise ratio from results of the measurement.

2. A method of measuring an optical signal-to-noise ratio as claimed in claim 1, the method further comprising the step of a performing a plurality of measurements at respectively different noise measurement frequencies to determine the noise power of the channel signal.

3. A method of measuring an optical signal-to-noise ratio as claimed in claim 1, wherein the noise power is measured at an unoccupied channel.

4. A method of measuring an optical signal-to-noise ratio as claimed in claim 1, wherein the noise power is measured at an adjacent channel.

5. A method of measuring an optical signal-to-noise ratio as claimed in claim 1, wherein, for a transmission system containing add-drop equipment with channel filters as the frequency-dependent components, the noise power is measured at a noise measurement frequency for which a spacing to a channel center is less than a half channel frequency spacing.

6. A method of measuring an optical signal-to-noise ratio as claimed in claim 1, wherein the controller is a network management system.

7. A method of measuring an optical signal-to-noise ratio as claimed in claim 1, wherein, in addition to the signal measurement frequency and the frequency-dependent components used, an additional control criterion is used by the controller to transfer the noise measurement frequency to a measuring device.

* * * * *